(12) United States Patent
Nehring

(10) Patent No.: US 9,914,522 B2
(45) Date of Patent: Mar. 13, 2018

(54) FLOOR PANEL FOR AN AIRCRAFT, AND AN AIRCRAFT COMPRISING SUCH A FLOOR PANEL

(71) Applicant: Airbus Operations GmbH, Hamburg (DE)

(72) Inventor: Eckhard Nehring, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 155 days.

(21) Appl. No.: 14/880,728

(22) Filed: Oct. 12, 2015

(65) Prior Publication Data
US 2016/0121993 A1   May 5, 2016

(30) Foreign Application Priority Data

Oct. 29, 2014   (EP) ..................................... 14190827

(51) Int. Cl.
*B64C 1/18* (2006.01)
*B64C 1/40* (2006.01)
(Continued)

(52) U.S. Cl.
CPC ................ *B64C 1/18* (2013.01); *B32B 5/245* (2013.01); *B64C 1/40* (2013.01); *F24D 13/024* (2013.01);
(Continued)

(58) Field of Classification Search
CPC .................................... B64C 1/18; B64C 1/40
See application file for complete search history.

(56) References Cited

U.S. PATENT DOCUMENTS 3,697,728 A * 10/1972 Stirzenbecher ........... B64C 1/18
                                                                  219/213
6,611,659 B2 * 8/2003 Meisiek .................... B64C 1/18
                                                              219/213
(Continued)

FOREIGN PATENT DOCUMENTS

CN         1894131 A        1/2007
DE   10 2010 019777 A1     11/2011
(Continued)

OTHER PUBLICATIONS

Extended European Search Report for Application No. 141908277 dated Apr. 16, 2015.
(Continued)

*Primary Examiner* — Justin M Benedik
(74) *Attorney, Agent, or Firm* — Jenkins, Wilson, Taylor & Hunt, P.A.

(57) ABSTRACT

A floor panel for an aircraft comprising a panel structure for transmitting forces applied to the floor panel, wherein the panel structure includes an upper cover layer, a lower cover layer, and a core assembly sandwiched between the upper and lower cover layers, and a heater layer for heating the floor panel, wherein the heater layer is provided between the upper and lower cover layers. The object of the present disclosure, to provide a possibly simple heated floor panel for an aircraft, wherein the risk of overheating and at the same time the risk of local hot spots at the heater layer is reduced, is achieved in that the heater layer is formed as a PTC-layer having a plurality of electric conductor paths interconnected to one another by a plurality of PTC-resistor paths comprising a PTC-material, wherein the electric resistance of the PTC-Material increases with increasing temperature.

15 Claims, 2 Drawing Sheets

(51) Int. Cl.
*H05B 3/34* (2006.01)
*F24D 13/02* (2006.01)
*B32B 5/24* (2006.01)

(52) U.S. Cl.
CPC ........ *H05B 3/34* (2013.01); *B32B 2262/0269* (2013.01); *B32B 2262/101* (2013.01); *B32B 2262/106* (2013.01); *H05B 2203/02* (2013.01); *H05B 2203/026* (2013.01); *Y02B 30/26* (2013.01)

(56) References Cited

U.S. PATENT DOCUMENTS 7,740,201 B2 6/2010 Eichholz et al.
8,712,227 B2* 4/2014 Meisiek ................ F16L 53/008
                  219/504
9,623,951 B2* 4/2017 Hu ......................... B64D 13/00
2010/0065686 A1* 3/2010 Tauscher ................... B64C 1/18
                  244/129.1

FOREIGN PATENT DOCUMENTS

EP    1046576 B1 10/2006
WO  WO 01/17850 A1 3/2001
WO  WO 2013/093494 A1 6/2013
WO  WO 2014/031528 A2 2/2014
WO  WO 2014031528 A2 * 2/2014 ............ E04B 1/942

OTHER PUBLICATIONS

Chinese Office Action for Application No. 2015107182518 dated Mar. 16, 2017.

* cited by examiner

FLOOR PANEL FOR AN AIRCRAFT, AND AN AIRCRAFT COMPRISING SUCH A FLOOR PANEL

CROSS-REFERENCE TO RELATED APPLICATION

This application claims priority to European Patent Application No. 14190827.7 filed Oct. 29, 2014, the entire disclosure of which is incorporated by reference herein.

TECHNICAL FIELD

The present disclosure relates to a floor panel for an aircraft. The floor panel comprises a panel structure and a heater layer for heating the floor panel. The panel structure is configured for transmitting forces applied to the floor panel, in particular forces in a normal direction of the floor panel caused for example by the cabin assembly and by any passengers. The panel structure is preferably formed as a sandwich structure and includes an upper cover layer pointing to the cabin, a lower cover layer pointing away from the cabin, and a core assembly which is sandwiched between the upper cover layer and the lower cover layer. The heater layer is formed as an electric heater layer and configured for heating the floor panel. The heater layer is provided either between the upper cover layer and the lower cover layer, or attached to the upper cover layer and/or the lower cover layer, or inside the upper cover layer and/or the lower cover layer.

BACKGROUND

Heated floor panels are commonly employed in passenger aircrafts in the door areas of the cabin, where due to imperfect heat insulation at the doors, in particular in high flight altitudes, the temperature can be considerably lower than the temperature of the rest of the cabin.

Such heated floor panels are known in the art, e.g. from EP 1 046 576 B1, wherein a heater foil made of Kapton or Cupron material is sandwiched between several layers of fiber composite material and aluminum material. In order to control the temperature of the floor panel and as a security measure against overheating of the heater foil the floor panel comprises a temperature control unit including a temperature sensor, as well as an overheating switch. However, such temperature sensor and overheating switch form extensive components inside the floor panel, which may weaken the layered sandwich structure of the floor panel, in particular at the sides and edges of the panel where the temperature sensor and the overheating switch are located. As a consequence, in particular upon impact and continuous loading of the floor panel, the floor panel might delaminate at its sides or edges. Due to such delamination of the floor panel water might enter the floor panel causing short circuits in the heater foil, which in turn may lead to undesired hot spots on the floor panel.

From DE 10 2010 019 777 A1 a heating system for a fluid conductor in an aircraft is known, wherein PTC-heater elements are applied in order to heat the fluid conductor to maintain the fluid in the fluid conductors in the liquid state.

SUMMARY

Therefore, an object of the present disclosure is to provide a possibly simple heated floor panel for an aircraft, wherein the risk of overheating and at the same time the risk of local hot spots at the heater layer is reduced.

This object is achieved by a heater layer which is formed as a PTC-layer. The PTC-layer may preferably be formed as a foil or a textile or a lacquer and has a plurality of electric conductor paths which are interconnected to one another by one or more, preferably by a plurality of, PTC-resistor paths comprising or made of a PTC-material. That means the PTC-resistor paths are connected in parallel to any two adjacent conductor paths. One of each two adjacent conductor paths is preferably connected to an anode, while the other one of each two adjacent conductor paths is connected to a cathode, so that current may flow through the PTC-resistor paths. PTC-material stands for positive temperature coefficient material for which the electric resistance increases with increasing temperature. As a PTC-material for example a polymeric matrix material, such as polyethylene, can be used which is provided with electrically conductive particles, such as carbon black particles. Alternatively, a ceramic material can be used as PTC-material.

By such a heater layer which is formed as a PTC-layer no temperature control unit, i.e. no temperature sensor and no overheating switch is necessary, anymore, since the PTC-material limits the temperature itself by limiting the current flowing through the PTC-resistor paths due to the increase in electric resistance as a consequence of the increase in temperature. Without a temperature control unit the heated floor panel is composed in a much simpler manner and the material is not weakened so that the risk of delamination and hot spots is considerably decreased. In addition, in the case that water enters the floor panel, however, and causes a short circuit at the heater layer, the occurring hot spots do not grow to areas without water contact, since the current flowing through each PTC-resistor path is too low.

According to a preferred embodiment the heater layer is provided between the upper cover layer and the core assembly. In such a way the heater layer is close to the upper cover layer, so that heat can be transferred quickly to the cabin.

In particular, it is preferred that an upper additional layer is provided between the heater layer and the upper cover layer. Additionally or alternatively, a lower additional layer is provided between the heater layer and the core assembly. By such upper and lower additional layers the heater layer is provided with an additional protection against impact and corrosion.

According to an alternative embodiment the core assembly comprises an upper core portion and a lower core portion, wherein the heater layer is provided between the upper core portion and the lower core portion. In such a way the heater layer is disposed further away from the upper cover layer, so that the risk of damage of the heater layer due to impact on the upper cover layer is reduced.

In particular, it is preferred that an upper additional layer is provided between the heater layer and the upper core portion. Additionally or alternatively, a lower additional layer is provided between heater layer and the lower core portion. By such upper and lower additional layers an additional protection of the heater layer against impact and corrosion is provided.

In a preferred embodiment the upper additional layer and/or the lower additional layer is formed of a fiber composite material, in particular of a glass fiber reinforced plastic (GFRP) material, preferably in the form of prepreg layers, or of an aramid fiber material, such as KEVLAR®. GFRP-material and aramid fiber material both provide a good protection against impact and corrosion, and are electrically insulating.

In a further preferred embodiment the upper cover layer and/or the lower cover layer is formed of a fiber composite material, in particular of a carbon fiber reinforced plastic (CFRP) material, or a glass fiber reinforced plastic (GFRP) material, preferably in the form of prepreg layers. Such CFRP- and GFRP-material is suitable as a cover layer because of its high strength and impact resistance. Alternatively, the upper cover layer and/or the lower cover layer may be formed of an aramid fiber material, such as KEVLAR®, or of a metallic material, such as a titan, aluminum, or stainless steel. Also, the upper cover layer and/or the lower cover layer may be formed of a combination of two or more of these materials.

In yet a further preferred embodiment the core assembly comprises a honeycomb structure. Additionally or alternatively the core assembly comprises a foam material which might be reinforced by pins. Both honeycomb structure and foam material are suitable for the core assembly because of their light weight and their good ability to transfer shear forces.

According to yet another preferred embodiment the conductor paths extend in parallel to one another, and the PTC-resistor paths extend in parallel to one another as well as transverse to the conductor elements. In such a way each PTC-resistor path connects two adjacent conductor paths. In particular, a plurality of PTC-resistor paths connects two adjacent conductor paths, wherein each pair of adjacent conductor paths has one conductor path which is connected to an anode and another conductor path which is connected to a cathode. By such an arrangement of conductor paths and PTC-resistor paths a two-dimensional planar heater layer in the form of a PTC-layer can be formed which can generate a smooth, homogenous heat distribution over the floor panel.

In particular, it is preferred that the distance between two adjacent conductor paths, the cross section of the PTC-resistor paths, and the density of the PTC-material are configured such that for a desired operational current through the conductor paths at a fixed ambient temperature outside an associated aircraft a desired carpet temperature at the upper cover layer is reached. Such desired carpet temperature may preferably be 24° C. The term "carpet temperature" refers to the temperature at the upper surface of the upper cover layer and does not necessary require that an actual carpet is provided above the upper cover layer. Instead of a carpet any other floor cover may be provided, such as e.g. a non textile flooring (NTF) cover. In such a manner the electrical resistance of the PTC-resistor paths can be configured for a preferred operational current and a preferred or averaged ambient temperature. Based on these starting conditions the operational current can be adapted to a changing ambient temperature during flight, in order to remain a desired temperature in the door areas of the cabin.

According to another preferred embodiment a current supply is provided and a control unit is provided configured to control a current flowing through the conductor paths in dependence of an ambient temperature outside of an associated aircraft. In particular, the current is controlled such that when the current flowing through the conductor paths is higher than a predetermined threshold current which corresponds to a defined maximum carpet temperature at the upper cover layer and which depends on the ambient temperature, the current supply is switched on, wherein when the current flowing through the conductor paths is lower than the predetermined threshold current, the current supply is switched off.

In such a manner, the temperature, in particular the carpet temperature at the upper cover layer can be controlled without continuously sensing the temperature, merely by controlling the current flowing through the conductor paths. A maximum carpet temperature can thus not be exceeded. However, even if the carpet temperature would exceed the defined maximum carpet temperature because e.g. the control unit might not work as intended, the PTC-resistor paths would limit the increasing current flow and thus the increasing panel temperature by its electric resistance increasing with increasing temperature of the PTC-material. Therefore, the risk of hot spots is extremely low for the heater layer formed as a PTC-layer.

According to a preferred embodiment a GFCI-device is connected to the conductor paths. GFCI stands for Ground Fault Circuit Interrupter. The GFCI-device forms an additional safety measure to interrupt, i.e. switch off, the current through the heater layer in case of fault, e.g. short circuits due to water intrusion into the floor panel up to the heater layer.

According to yet another preferred embodiment the floor panel comprises a temperature sensor which forms an additional safety measure to limit the temperature of the floor panel. The temperature sensor may also be used to control the carpet temperature at the upper cover layer.

A further aspect of the present disclosure relates to an aircraft comprising a floor panel which is formed in accordance with any of the afore-described embodiments. In particular, the floor panel may be arranged in a door area next to a door of a cabin of the aircraft. In such a way the door area, where usually a lower temperature than in the rest of the cabin is present, can be heated for the convenience of flight attendants and passengers.

BRIEF DESCRIPTION OF THE DRAWINGS

In the following a preferred embodiment of the floor panel according to the present disclosure is described in more detail by a drawing. The drawing shows in.

DETAILED DESCRIPTION

Figure 1:
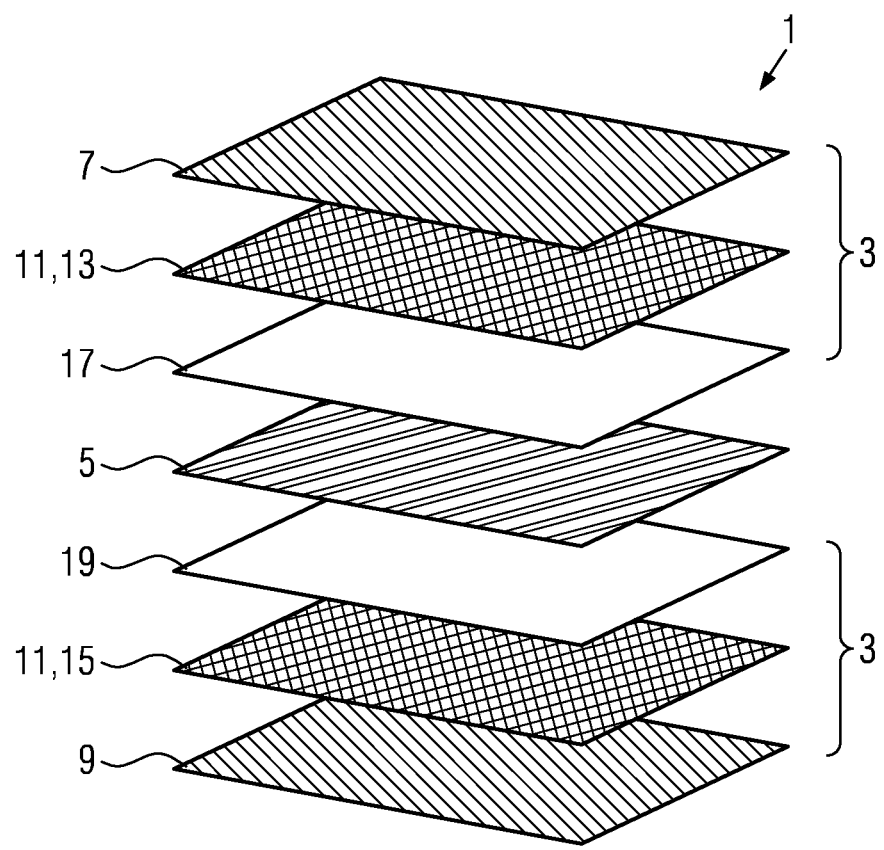
FIG. 1 an exploded view of the floor panel showing a plurality of different layers.

In FIG. 1 an embodiment of a floor panel 1 for an aircraft is illustrated. The floor panel 1 comprises a panel structure 3 for transmitting forces applied to the floor panel 1, and a heater layer 5 for heating the floor panel 1. The panel structure 3 is formed as a sandwich structure including an upper cover layer 7 which is intended to be directed to a cabin of an associated aircraft, a lower cover layer 9 opposite to the upper cover layer 7, and a core assembly 11 which is sandwiched between the upper cover layer 7 and the lower cover layer 9. The heater layer 5 is provided between the upper and lower cover layers 7, 9 and formed as a PTC-layer, in the present embodiment a PTC-foil.

As shown in FIG. 1, the core assembly 11 comprises an upper core portion 13 and a lower core portion 15, and the heater layer 5 is provided in between the upper and lower core portions 13, 15. Between the heater layer 5 and the upper core portion 13 an upper additional layer 17 is provided. Between the heater layer 5 and the lower core portion 15 a lower additional layer 19 is provided. In such a manner, the heater layer 5 is sandwiched between upper and lower additional layers 17, 19, which in turn are sandwiched between upper and lower core portions 13, 15, which in turn are sandwiched between upper and lower cover layers 7, 9.

The upper and lower cover layers 7, 9 are made of carbon fiber reinforced plastic (CFRP) material, in particular of CFRP-prepreg layers. The core assembly 11, i.e. the upper and lower core portions 13, 15, is made of a honeycomb structure. The upper and lower additional layers 17, 19 are made of a glass fiber reinforced plastic (GFRP) material.

Figure 2:
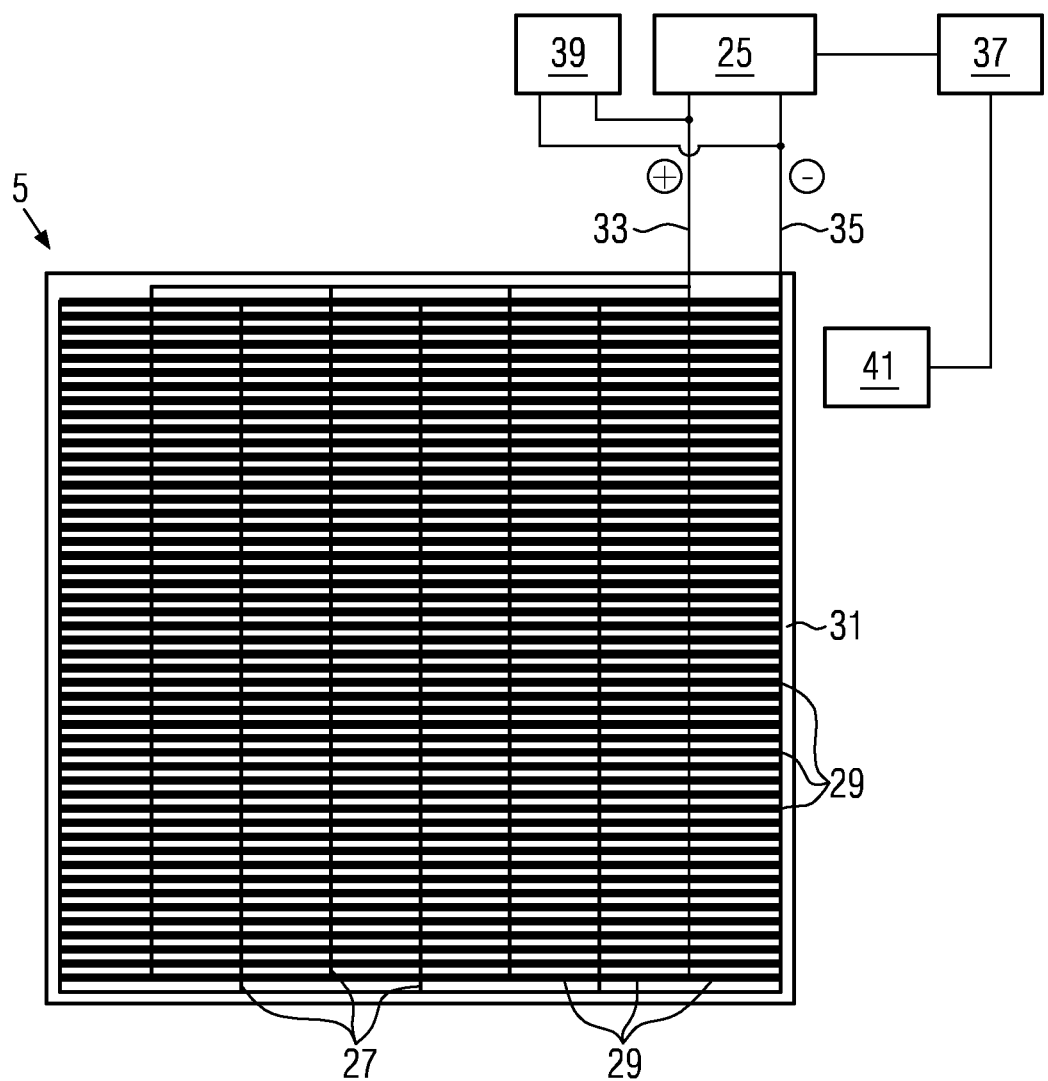
FIG. 2 a top view of the heater layer shown in FIG. 1, wherein the heater layer is formed as a PTC-layer.

As shown in FIG. 2, the heater layer 5 has a plurality of electric conductor paths 27 which are connected to one another by a plurality of PTC-resistor paths 29 comprising a PTC-material. The PTC-material is configured such that its electric resistance increases with its increasing temperature, and in the present embodiment is a polyethylene matrix material provided with carbon black particles. The conductor paths 27 and the PTC-resistor paths 29 are provided on an insulating substrate 31. The conductor paths 27 extend in parallel to one another, and the PTC-resistor paths 29 extend in parallel to one another and transverse to the conductor paths 27. Each PTC-resistor path 29 connects two adjacent conductor paths 27. One of each pair of adjacent conductor paths 27 is connected to an anode 33, while the other one of each pair of adjacent conductor paths 27 is connected to a cathode 35, so that current may flow through the PTC-resistor paths 29 connecting both conductor paths 27. The distance between two adjacent conductor paths 27, the cross section of the PTC-resistor paths 29, and the density of the PTC-material are configured such that for a desired operational current at a fixed ambient temperature outside of an associated aircraft a desired carpet temperature is reached at the upper cover layer 7.

Further, a current supply 25 and a control unit 37 are provided. The control unit 37 is configured to control a current flowing through the conductor paths 27 and provided by the current supply 25 in dependence of an ambient temperature. As an additional security measure the floor panel 1 comprises a GFCI-device 39 for disconnecting the current supply 25 upon a fault current, e.g. a short circuit, as well as a temperature sensor 41 for detecting the temperature of the floor panel 1.

The floor panel 1 can be used in the following manner. For a plurality of defined ambient temperatures outside the associated aircraft a desired maximum carpet temperature is defined, and a plurality of values of a threshold current flowing through the conductor paths 27 are determined, each of which corresponding to one defined maximum carpet temperature and its associated ambient temperature. The control unit 37 controls the current supply 25 such that when the current flowing through the conductor paths 27 is higher than the predetermined threshold current, the current supply 25 is switched on, and when the current flowing through the conductor paths 27 is lower than the predetermined threshold current, the current supply 25 is switched off. In such a manner the carpet temperature at the upper cover layer 7 can be controlled by merely controlling the current without any temperature sensor or overheating switch required. In addition, the temperature of the floor panel 1 is limited by the PTC-resistor paths 29 which increase the electric resistance and thus decrease the current flow, with increasing temperature of the PTC-material.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floor panel for an aircraft, the floor panel comprising:
   a panel structure for transmitting forces applied to the floor panel, wherein the panel structure comprises an upper cover layer, a lower cover layer, and a core assembly sandwiched between the upper and lower cover layers; and
   a heater layer for heating the floor panel,
   wherein the heater layer is formed as a PTC-layer having a plurality of electric conductor paths interconnected to one another by one or more PTC-resistor paths comprising a PTC-material, wherein the electric resistance of the PTC-Material increases with increasing temperature,
   wherein the core assembly comprises an upper core portion and a lower core portion, and
   wherein the heater layer is provided between the upper core portion and the lower core portion, or the heater layer is provided attached to or inside the lower cover layer.

2. The floor panel according to claim 1, wherein an upper additional layer is provided between the heater layer and the upper core portion.

3. The floor panel according to claim 2, wherein the upper additional layer is formed of a glass fiber reinforced plastic material or of an aramid fiber material.

4. The floor panel according to claim 1, wherein a lower additional layer is provided between the heater layer and the lower core portion.

5. The floor panel according to claim 4, wherein the lower additional layer is formed of a glass fiber reinforced plastic material or of an aramid fiber material.

6. The floor panel according to claim 1, wherein the upper cover layer is formed of a carbon fiber reinforced plastic material, a glass fiber reinforced plastic material, an aramid fiber material, a metal material, or a combination thereof.

7. The floor panel according to claim 1, wherein the lower cover layer is formed of a carbon fiber reinforced plastic material, a glass fiber reinforced plastic material, an aramid fiber material, a metal material, or a combination thereof.

8. The floor panel according to claim 1, wherein the core assembly comprises a honeycomb structure or a foam material.

9. The floor panel according to claim 1, wherein the conductor paths extend in parallel to one another, and wherein the PTC-resistor paths extend in parallel to one another and transverse to the conductor paths, so that each PTC-resistor path connects two adjacent conductor paths.

10. The floor panel according to claim 9, wherein the distance between two adjacent conductor paths, the cross section of the PTC-resistor paths, and the density of the PTC-material are configured such that for a desired operational current at a fixed ambient temperature a desired carpet temperature at the upper cover layer is reached.

11. The floor panel according to claim 1, wherein a current supply and a control unit are provided, wherein the control unit is configured to control a current flowing through the conductor paths in dependence of an ambient temperature, such that when the current flowing through the conductor path is higher than a predetermined threshold current which corresponds to a defined maximum carpet temperature at the upper cover layer and which depends on the ambient temperature, the current supply is switched on, wherein when the current flowing through the conductor paths is lower than the predetermined threshold current, the current supply is switched off.

12. The floor panel according to claim 1, wherein a GFCI-device is provided and connected to the conductor paths.

13. The floor panel according to claim 1, wherein the floor panel comprises a temperature sensor.

14. An aircraft comprising a floor panel according to claim 1.

15. The aircraft according to claim 14, wherein the floor panel is arranged in a door area next to a door of a cabin of the aircraft.

* * * * *